(12) United States Patent
Liao

(10) Patent No.: US 8,104,777 B2
(45) Date of Patent: Jan. 31, 2012

(54) GOLF CART COLLAPSIBLE DEVICE

(75) Inventor: Gordon Liao, Yung Kang (TW)

(73) Assignee: Unique Product & Design Co., Ltd., Tainan Hsien (TW)

( * ) Notice: Subject to any disclaimer, the term of this patent is extended or adjusted under 35 U.S.C. 154(b) by 798 days.

(21) Appl. No.: 12/139,625

(22) Filed: Jun. 16, 2008

(65) Prior Publication Data
US 2009/0309334 A1  Dec. 17, 2009

(51) Int. Cl.
*B62B 3/02* (2006.01)

(52) U.S. Cl. ........ 280/38; 280/651; 280/62; 280/DIG. 6

(58) Field of Classification Search .................... 280/38, 280/42, 62, 47.11, 47.34, 47.35, 638, 639, 280/641, 646, 651, 654, 655, DIG. 6
See application file for complete search history.

(56) References Cited

U.S. PATENT DOCUMENTS

| | | | | |
|---|---|---|---|---|
| 2,619,360 A * | 11/1952 | Alter | ............... | 280/42 |
| 2,914,336 A * | 11/1959 | Hibben, Jr. et al. | ............. | 280/42 |
| 3,407,892 A * | 10/1968 | Vosseller | ............... | 180/19.1 |
| 4,538,696 A * | 9/1985 | Carter | ............... | 180/19.3 |
| 4,606,550 A * | 8/1986 | Cone | ............... | 280/642 |
| 4,784,401 A * | 11/1988 | Raguet | ............... | 280/40 |
| 5,522,614 A * | 6/1996 | Eyman et al. | ............... | 280/642 |
| 6,079,718 A * | 6/2000 | Liao | ............... | 280/47.26 |
| 6,168,174 B1 * | 1/2001 | MacDougall | ............... | 280/47.34 |
| 6,481,518 B1 * | 11/2002 | Wu | ............... | 180/65.6 |
| 6,641,228 B2 * | 11/2003 | Liu | ............... | 301/111.06 |
| 7,063,340 B1 * | 6/2006 | Wu | ............... | 280/47.26 |
| 7,121,563 B1 * | 10/2006 | Liao | ............... | 280/47.22 |
| 7,219,920 B2 * | 5/2007 | Lin | ............... | 280/651 |
| 7,581,748 B2 * | 9/2009 | Reimers | ............... | 280/651 |
| 7,641,216 B2 * | 1/2010 | Cone, II | ............... | 280/642 |
| 2001/0033070 A1 * | 10/2001 | Reimers et al. | ............... | 280/651 |
| 2003/0122353 A1 * | 7/2003 | Liao | ............... | 280/651 |
| 2004/0195806 A1 * | 10/2004 | Reimers et al. | ............... | 280/651 |
| 2005/0121864 A1 * | 6/2005 | Liao | ............... | 280/38 |
| 2006/0192366 A1 * | 8/2006 | Kimberley | ............... | 280/651 |

\* cited by examiner

*Primary Examiner* — J. Allen Shriver, II
*Assistant Examiner* — Bridget Avery
(74) *Attorney, Agent, or Firm* — Alan Kamrath; Kamrath IP Lawfirm, PA

(57) ABSTRACT

A golf cart collapsible device includes a frame folding articulation mounted between an upper frame and a lower frame for folding the upper frame, a frame collapsing articulation mounted on the lower frame for folding the lower frame, a rear wheel frame mounted between the frame folding articulation and a rear wheel, a first pull bar mounted between the frame folding articulation and the rear wheel frame for folding the rear wheel, a front wheel folding articulation mounted between the lower frame and a front wheel frame for folding a front wheel, and a second pull bar mounted between the rear wheel frame and the front wheel folding articulation. Thus, the front wheel and the at least one rear wheel are folded simultaneously by linking of the first pull bar and the second pull bar.

11 Claims, 8 Drawing Sheets

GOLF CART COLLAPSIBLE DEVICE

BACKGROUND OF THE INVENTION

1. Field of the Invention

The present invention relates to a collapsible device and, more particularly, to a collapsible device for a golf cart.

2. Description of the Related Art

A conventional golf cart collapsible device in accordance with the prior art shown in FIG. 8 comprises a first foldable articulation 11 mounted between an upper frame 1 and a lower frame 2 for folding the upper frame 1, a second foldable articulation 12 mounted on a mediate portion of the lower frame 2 for folding the lower frame 2, a third foldable articulation 13 mounted between the lower frame 2 and a front wheel frame 41 for folding a front wheel 4, two rear wheel frames 31 mounted between the lower frame 2 and two rear wheels 3, and two pull bars 32 each mounted between the upper frame 1 and a respective one of the rear wheel frames 31. Thus, the two pull bars 32 are connected between the upper frame 1 and the rear wheel frames 31, so that when the upper frame 1 is folded, the two rear wheels frames 31 are moved forward to fold the two rear wheels 3 and the upper frame 1 simultaneously. However, the front wheel 4 and the two rear wheels 3 are folded independently and cannot be folded simultaneously, so that a user has to hunker to operate the third foldable articulation 13 to fold or expand the front wheel 4, thereby causing inconvenience to the user when folding or expanding the golf cart.

BRIEF SUMMARY OF THE INVENTION

In accordance with the present invention, there is provided a collapsible device for a golf cart, comprising a frame folding articulation mounted between an upper frame and a lower frame for folding the upper frame, a frame collapsing articulation mounted on a mediate portion of the lower frame for folding the rear wheel frame, a rear wheel frame mounted between the frame folding articulation and at least one rear wheel, a first pull bar mounted between the upper frame and the rear wheel frame for folding the at least one rear wheel, a front wheel folding articulation mounted between the lower frame and a front wheel frame for folding a front wheel, and a second pull bar mounted between the rear wheel frame and the front wheel frame. The front wheel and the at least one rear wheel are folded simultaneously by linking of the first pull bar and the second pull bar.

The front wheel folding articulation includes a front wheel frame having a first end connected with the front wheel and a second end connected with the second pull bar, a bottom bracket secured on the front wheel frame and having a shaft, and a base mounted on a lower end of the lower frame and having one end pivotally connected with the front wheel frame by use of the shaft of the bottom bracket.

Preferably, the second pull bar may be connected between the front wheel frame and the rear wheel frame.

Preferably, the frame folding articulation is a rotating articulation.

Preferably, the frame folding articulation is a collapsing articulation.

Preferably, the upper frame has a double-tube structure.
Preferably, the upper frame has a single-tube structure.
Preferably, the lower frame has a double-tube structure.
Preferably, the lower frame has a single-tube structure.
Preferably, the front wheel has a double-wheel structure.

The primary objective of the present invention is to provide a golf cart collapsible device that is folded and expanded easily and quickly.

Another objective of the present invention is to provide a collapsible device for a golf cart, wherein the front wheel and the rear wheels are folded and expanded simultaneously by linking of the first pull bar and the second pull bar so that a user can fold and expand the golf cart easily and quickly without having to hunker or bend his/her body, thereby facilitating the user folding and expanding the golf cart.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
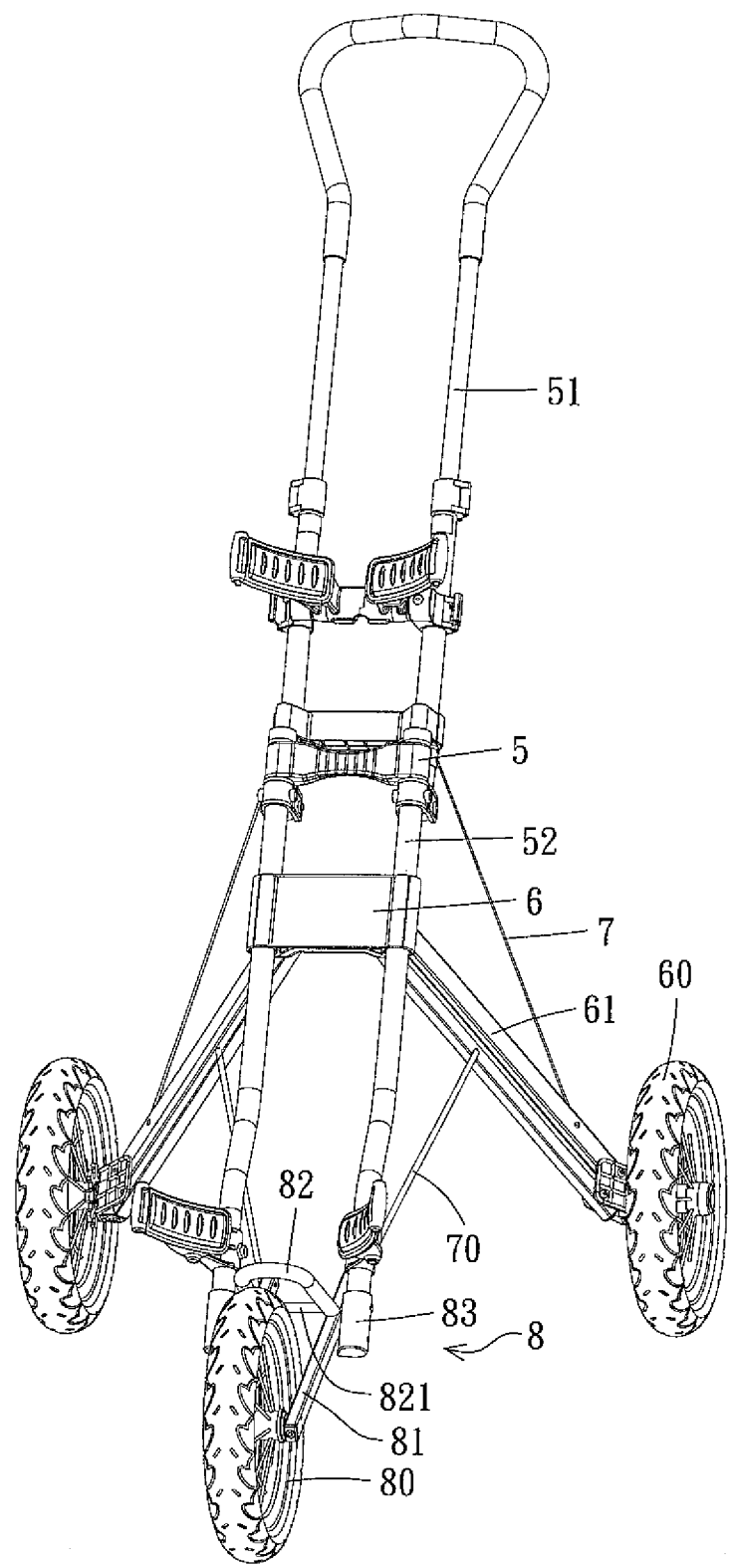
FIG. 1 is a perspective view of a collapsible device for a golf cart in accordance with the preferred embodiment of the present invention.
Figure 2:
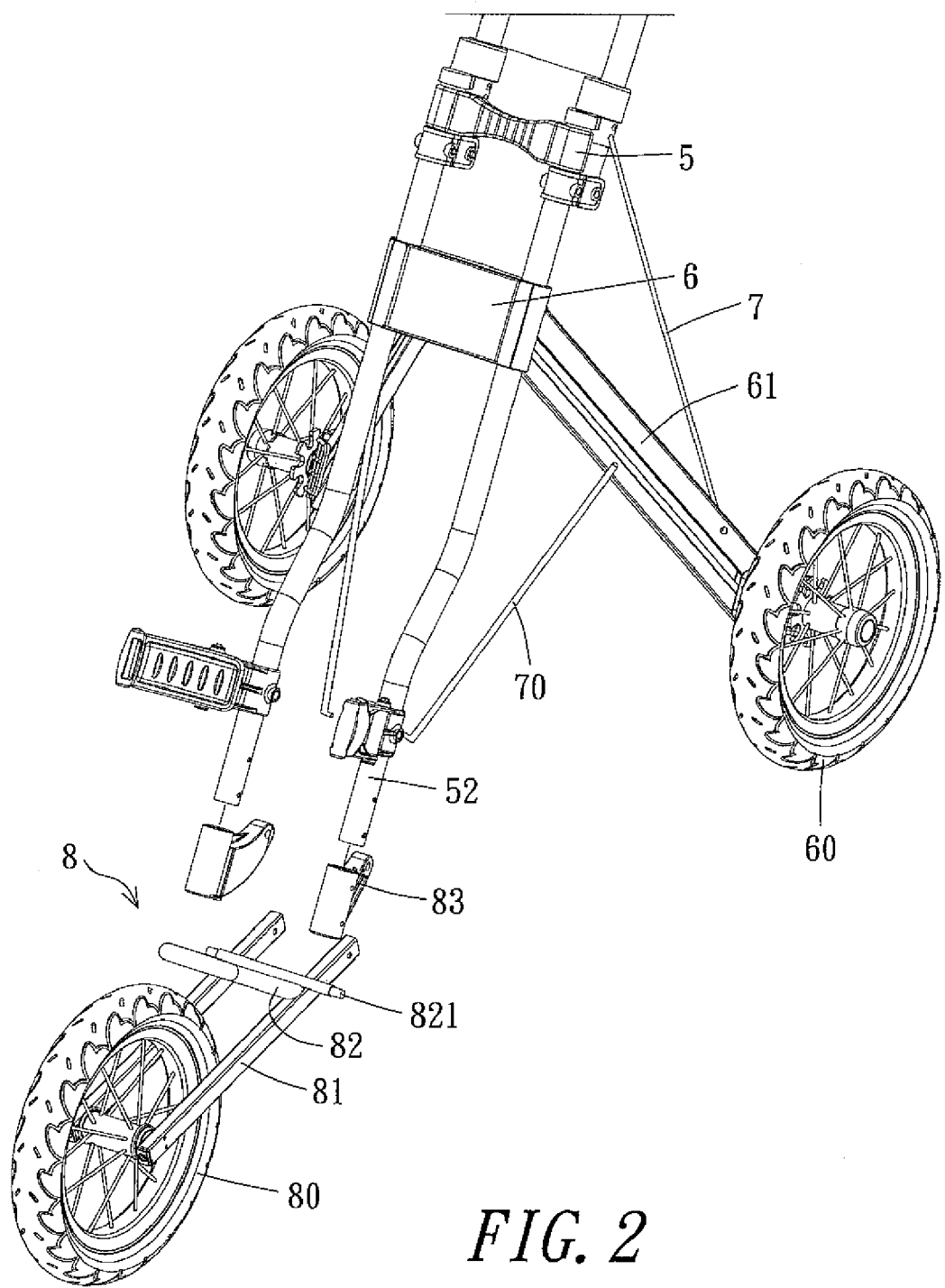
FIG. 2 is an exploded perspective view of the collapsible device for a golf cart as shown in FIG. 1.
Figure 3:
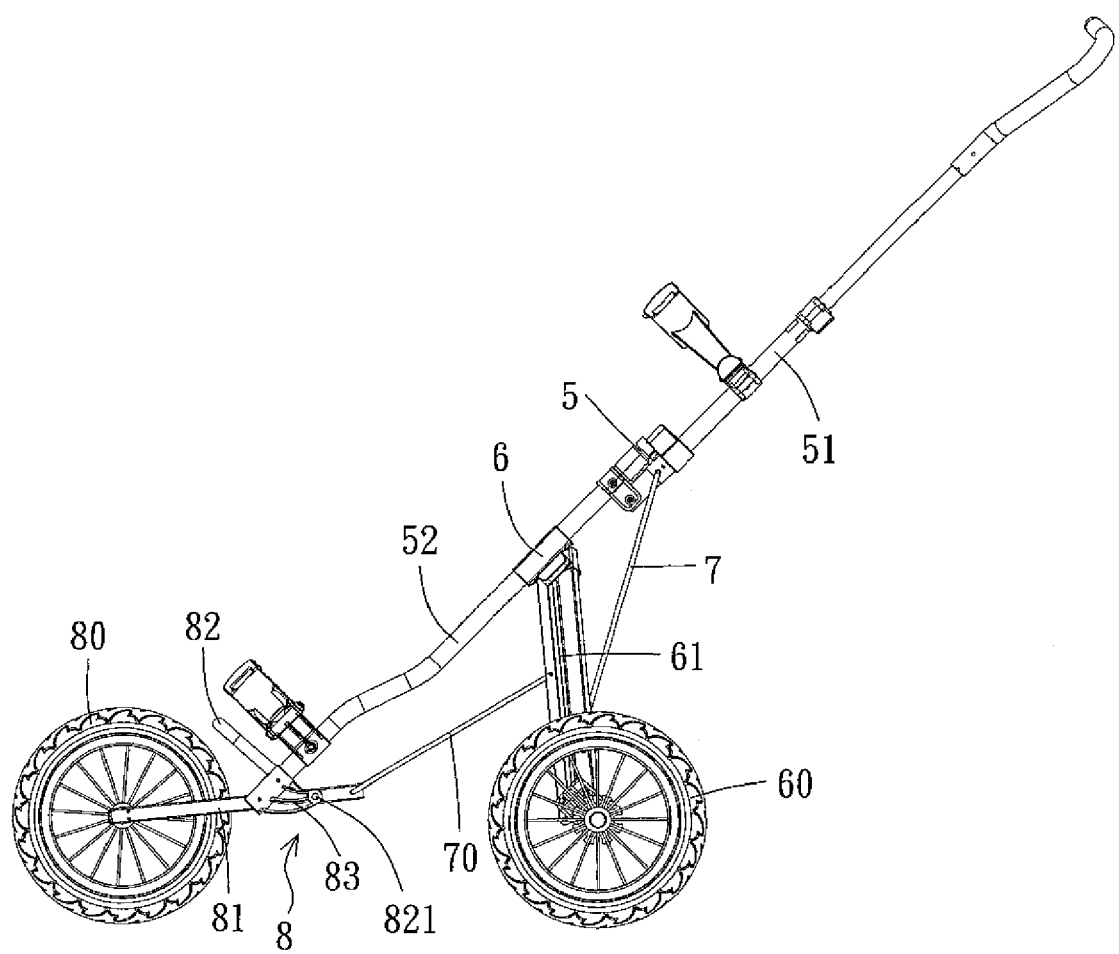
FIG. 3 is a side view of the collapsible device for a golf cart as shown in FIG. 1.

Referring to the drawings and initially to FIGS. 1-3, a collapsible device for a golf cart in accordance with the preferred embodiment of the present invention comprises a frame folding articulation 5 mounted between an upper frame 51 and a lower frame 52 for folding the upper frame 51, a frame collapsing articulation 6 mounted on a mediate portion of the lower frame 52 for folding the rear wheel frame 61, a rear wheel frame 61 mounted between the frame collapsing articulation 6 (or the lower frame 52) and two rear wheels 60, and a first pull bar 7 mounted between the upper frame 51 and the rear wheel frame 61 to connect the upper frame 51 and the rear wheel frame 61 so that the upper frame 51 and the rear wheel frame 61 are movable in concert with each other by linking of the first pull bar 7 so as to fold two rear wheels 60. Preferably, the frame folding articulation 5 is a conventional articulation including a rotating articulation or a collapsing articulation. The above-mentioned structure is conventional and will not be further described in detail.

In the preferred embodiment of the present invention, the golf cart collapsible device further comprises a second pull bar 70 mounted between the rear wheel frame 61 and a front wheel frame 81.

The front wheel folding articulation 8 includes a front wheel 80, a front wheel frame 81 having a first end connected with the front wheel 80 and a second end connected with the second pull bar 70, a bottom bracket 82 secured on the front wheel frame 81 and having a shaft 821, and a base 83 mounted on a lower end of the lower frame 52 and having one end pivotally connected with the front wheel frame 81 by use of the shaft 821 of the bottom bracket 82.

In such a manner, the second pull bar 70 is connected with the front wheel frame 81, that is, the second pull bar 70 is mounted between the front wheel frame 81 and the rear wheel frame 61 so that the front wheel frame 81 (or the front wheel 80) and the rear wheel frame 61 are movable in concert with each other by linking of the second pull bar 70.

Figure 4:
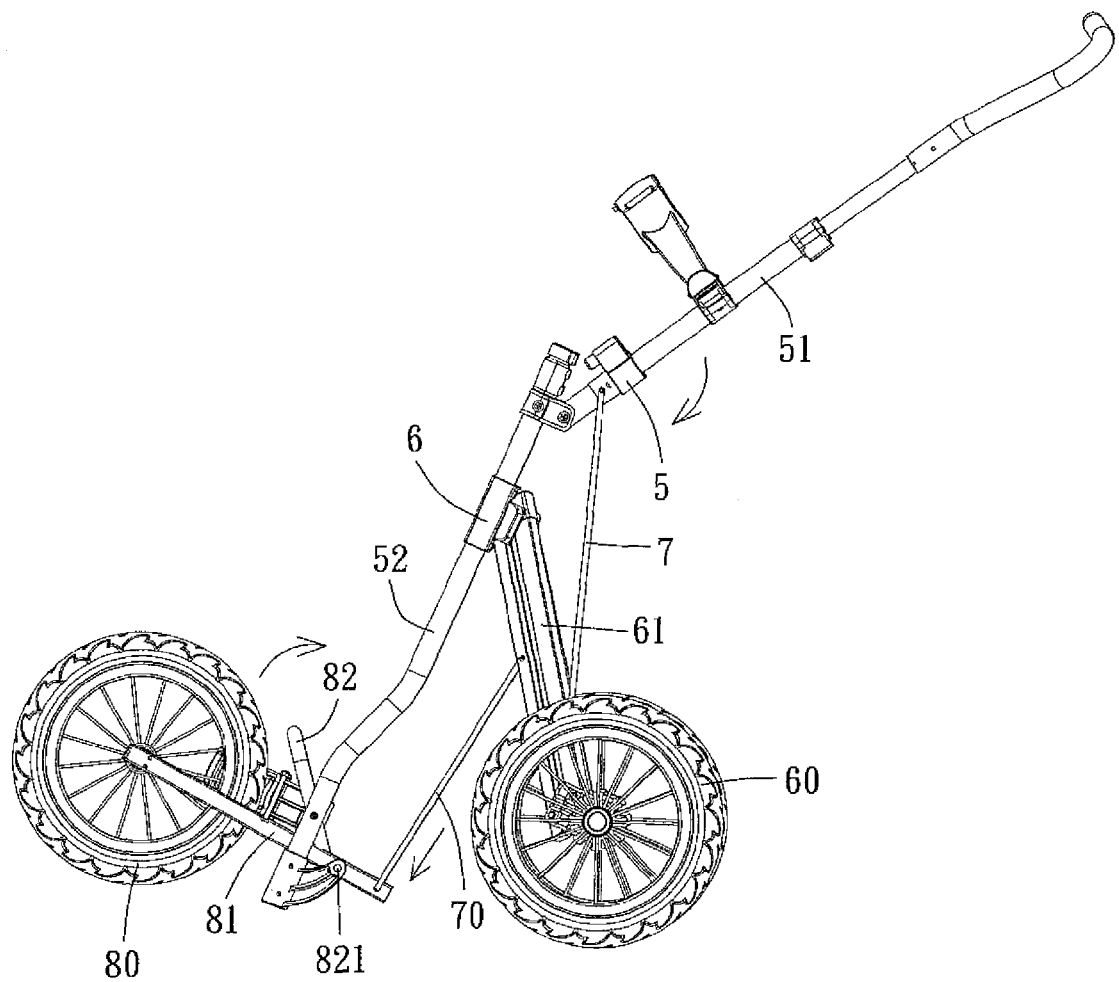
FIG. 4 is a schematic operational view of the collapsible device for a golf cart as shown in FIG. 3.
Figure 5:
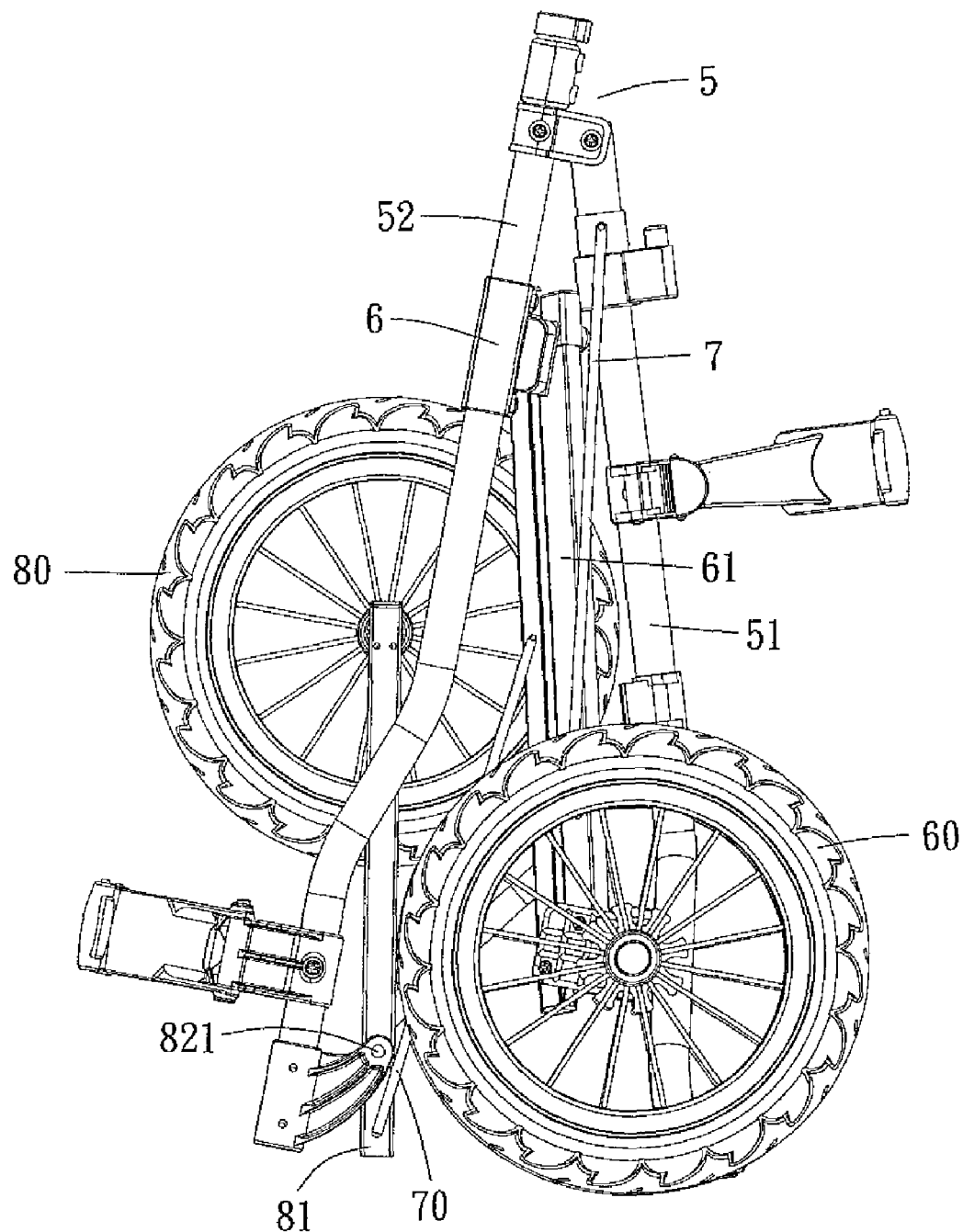
FIG. 5 is a schematic operational view of the collapsible device for a golf cart as shown in FIG. 4.

In operation, referring to FIGS. 4 and 5 with reference to FIGS. 1-3, when a user wishes to fold the golf cart, the frame folding articulation 5 is unlocked to unlock the upper frame 51, and the upper frame 51 is driven downward to drive the first pull bar 7 which drives the rear wheel frame 61 to retract inward so that the rear wheels 60 are retracted inward. At the same time, the rear wheel frame 61 drives the second pull bar 70 downward which drives the front wheel frame 81 to pivot about the shaft 821 of the bottom bracket 82 so that the front wheel frame 81 is moved upward and retracted inward, and the front wheel 80 is moved upward and folded inward as shown in FIGS. 4 and 5 so as to fold the front wheel 80. In such a manner, the front wheel 80 and the rear wheels 60 are folded simultaneously. Thus, when a user wishes to fold the golf cart, the front wheel 80 and the rear wheels 60 are folded simultaneously by linking of the first pull bar 7 and the second pull bar 70 as shown in FIGS. 4 and 5.

In conclusion, when a user wishes to fold (or collapse) the golf cart, the frame folding articulation 5 is unlocked to unlock the upper frame 51, and the upper frame 51 is driven downward to fold the front wheel 80 and the rear wheels 60 simultaneously by linking of the first pull bar 7 and the second pull bar 70. On the contrary, when a user wishes to expand the golf cart, the upper frame 51 is pulled (or rotated) upward to expand and position the frame folding articulation 5 and to expand and position the front wheel 80 and the rear wheels 60 simultaneously by linking of the first pull bar 7 and the second pull bar 70.

Accordingly, the front wheel 80 and the rear wheels 60 are folded and expanded simultaneously by linking of the first pull bar 7 and the second pull bar 70 so that a user can fold and expand the golf cart easily and quickly without having to hunker or bend his/her body, thereby facilitating the user folding and expanding the golf cart.

As shown in FIGS. 1-5, each of the upper frame 51 and the lower frame 52 has a double-tube structure, and the front wheel 80 has a single-wheel structure.

Figure 6:
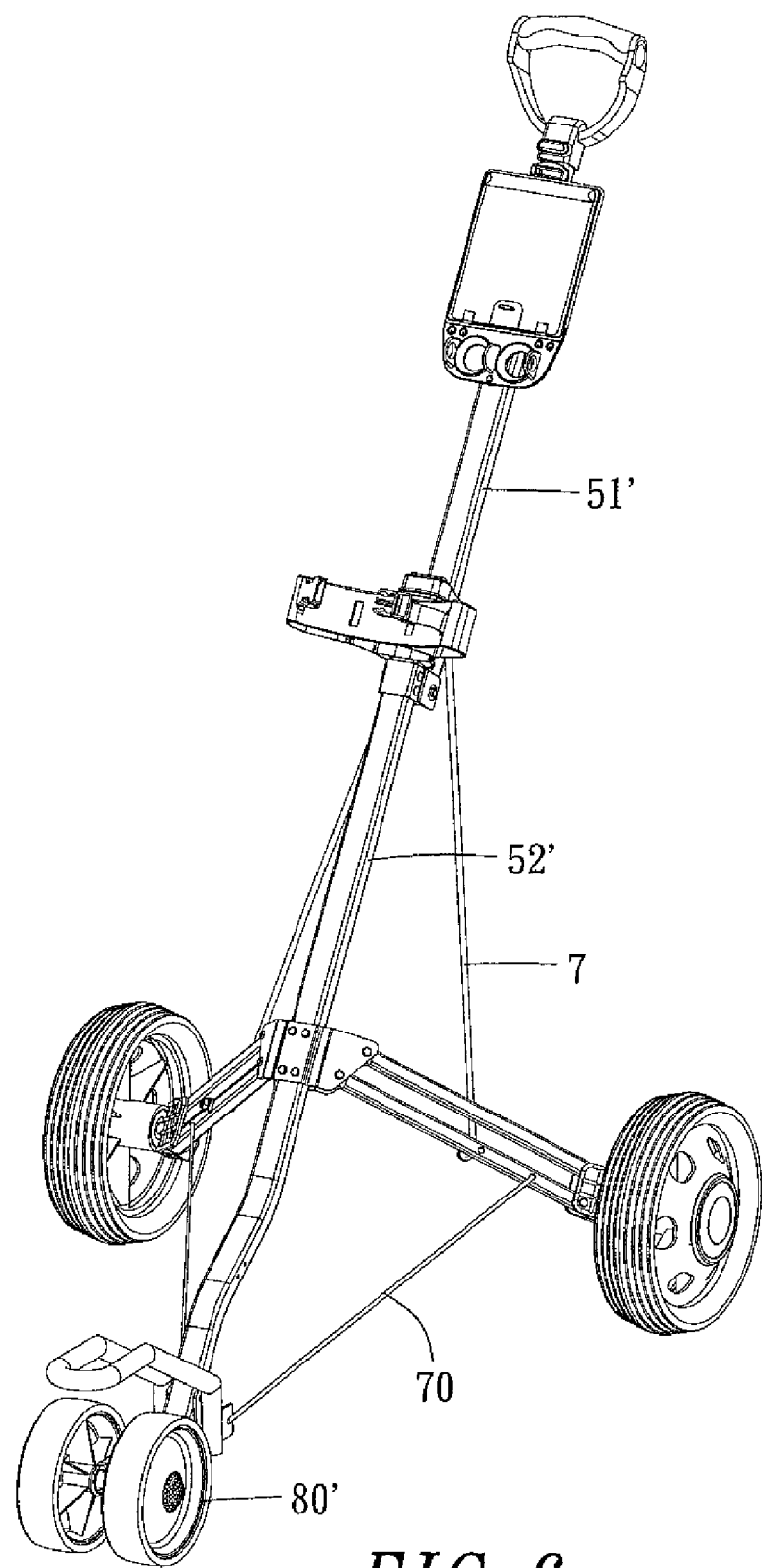
FIG. 6 is a perspective view of a collapsible device for a golf cart in accordance with another preferred embodiment of the present invention.
Figure 7:
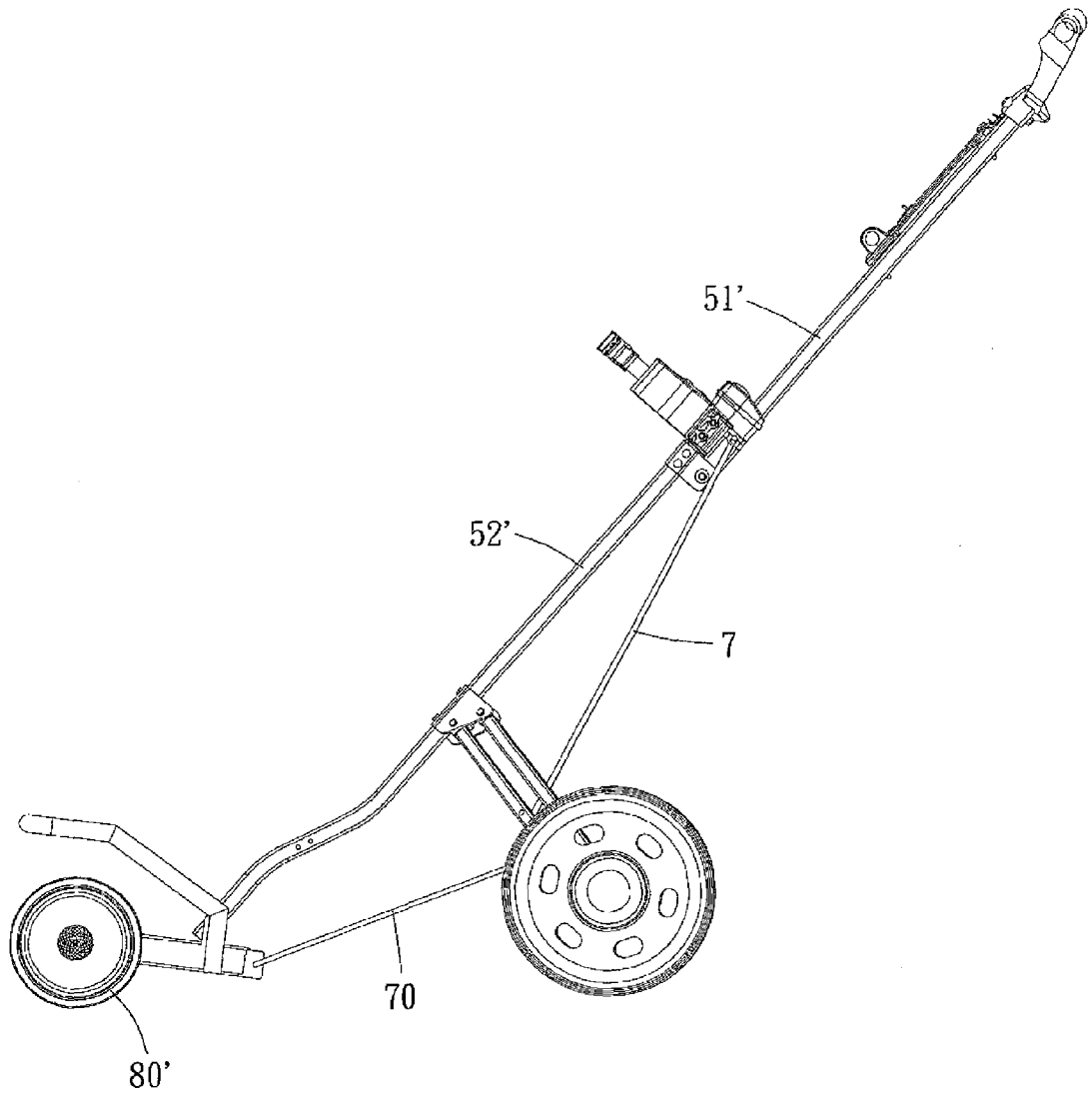
FIG. 7 is a side view of the collapsible device for a golf cart as shown in FIG. 6.
Figure 8:
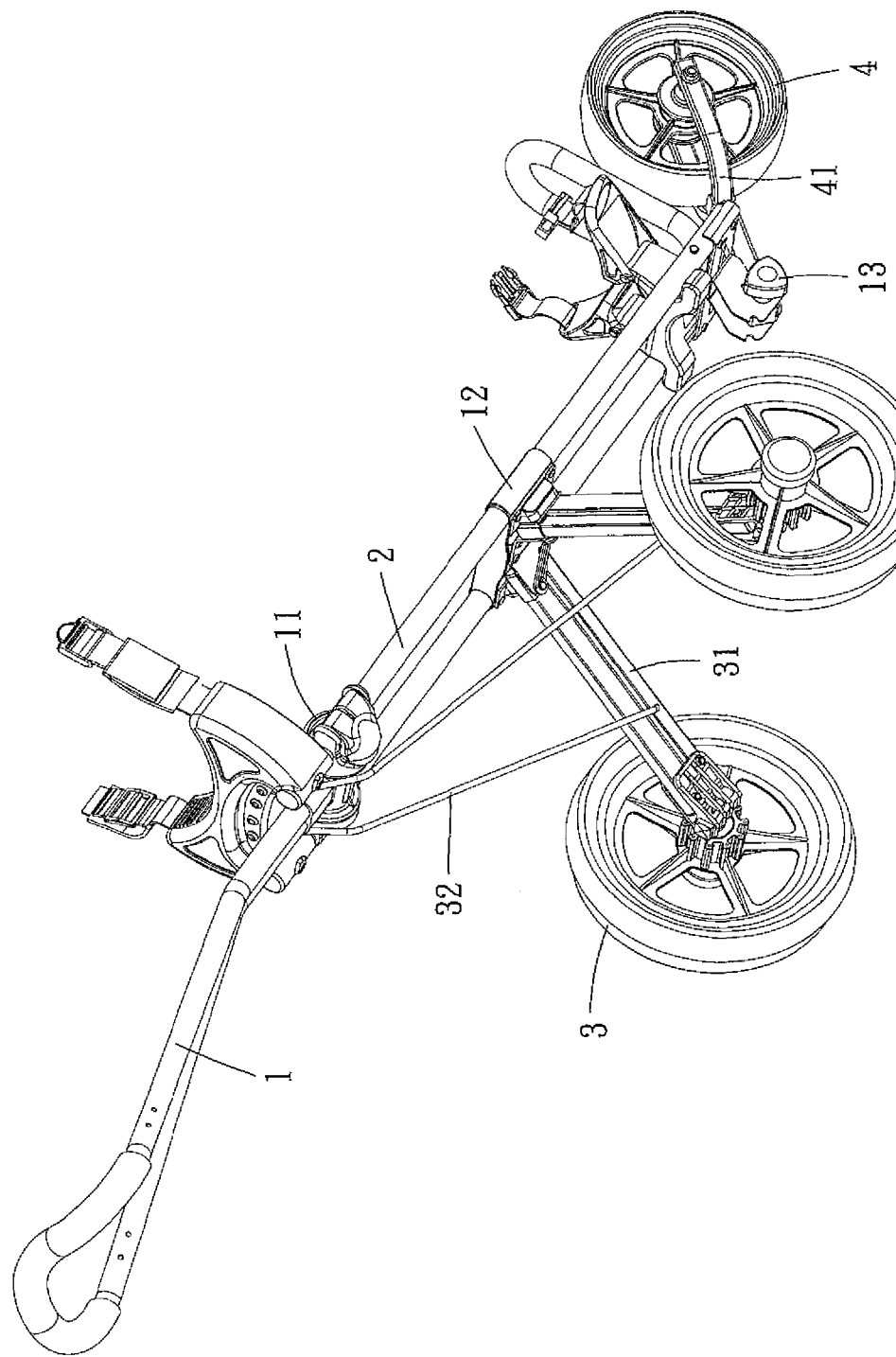
FIG. 8 is a perspective view of a conventional collapsible device for a golf cart in accordance with the prior art.

Referring to FIGS. 6 and 7, each of the upper frame 51' and the lower frame 52' has a single-tube structure, and the front wheel 80' has a double-wheel structure.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:

1. A collapsible device for a golf cart, comprising:
    a frame folding articulation mounted between an upper frame and a lower frame for folding the upper frame;
    a frame collapsing articulation mounted on a mediate portion of the lower frame for folding the lower frame;
    a rear wheel frame mounted between the frame collapsing articulation and at least one rear wheel;
    a first pull bar mounted between the frame articulation and the rear wheel frame for folding the at least one rear wheel;
    a front wheel folding articulation mounted between the lower frame and a front wheel frame for folding a front wheel;
    a second pull bar mounted between the rear wheel frame and the front wheel folding articulation;
    wherein the front wheel and the at least one rear wheel are folded simultaneously by linking of the first pull bar and the second pull bar;
    the first pull bar is connected with the upper frame and the rear wheel frame respectively;
    the second pull bar is connected with the rear wheel frame and the front wheel frame respectively;
    when a user folds the golf cart, the upper frame is driven rearward and downward to drive and push the first pull bar downward which drives the rear wheel frame to retract inward and drives the rear wheel to retract inward, and the rear wheel frame drives and pushes the second pull bar downward which drives the front wheel frame to pivot about the shaft of the bottom bracket so that the front wheel frame is moved upward and retracted inward, and the front wheel is moved upward and folded inward;
    the front wheel and the rear wheel are folded through a rotation motion;
    the front wheel is disposed above the rear wheel after the front wheel and the rear wheel are folded.

2. The collapsible device for a golf cart in accordance with claim 1, wherein the frame folding articulation is a rotating articulation.

3. The collapsible device for a golf cart in accordance with claim 1, wherein the frame folding articulation is a collapsing articulation.

4. The collapsible device for a golf cart in accordance with claim 1, wherein the upper frame has a double-tube structure.

5. The collapsible device for a golf cart in accordance with claim 1, wherein the upper frame has a single-tube structure.

6. The collapsible device for a golf cart in accordance with claim 1, wherein the lower frame has a double-tube structure.

7. The collapsible device for a golf cart in accordance with claim 1, wherein the lower frame has a single-tube structure.

8. The collapsible device for a golf cart in accordance with claim 1, wherein the front wheel folding articulation includes:
    the front wheel frame having a first end connected with the front wheel and a second end connected with the second pull bar;
    a bottom bracket secured on the front wheel frame and having a shaft;
    a base mounted on an outer side of the front wheel frame and having a first end pivotally connected with the shaft of the bottom bracket and a second end secured on a lower end of the lower frame.

9. The collapsible device for a golf cart in accordance with claim 1, wherein the second pull bar may be connected between the front wheel frame and the rear wheel frame.

10. The collapsible device for a golf cart in accordance with claim 1, wherein the front wheel has a double-wheel structure.

11. The collapsible device for a golf cart in accordance with claim 8, wherein the second pull bar may be connected between the front wheel frame and the rear wheel frame.

* * * * *